Figure 11:
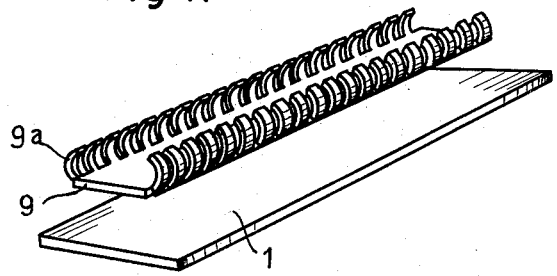

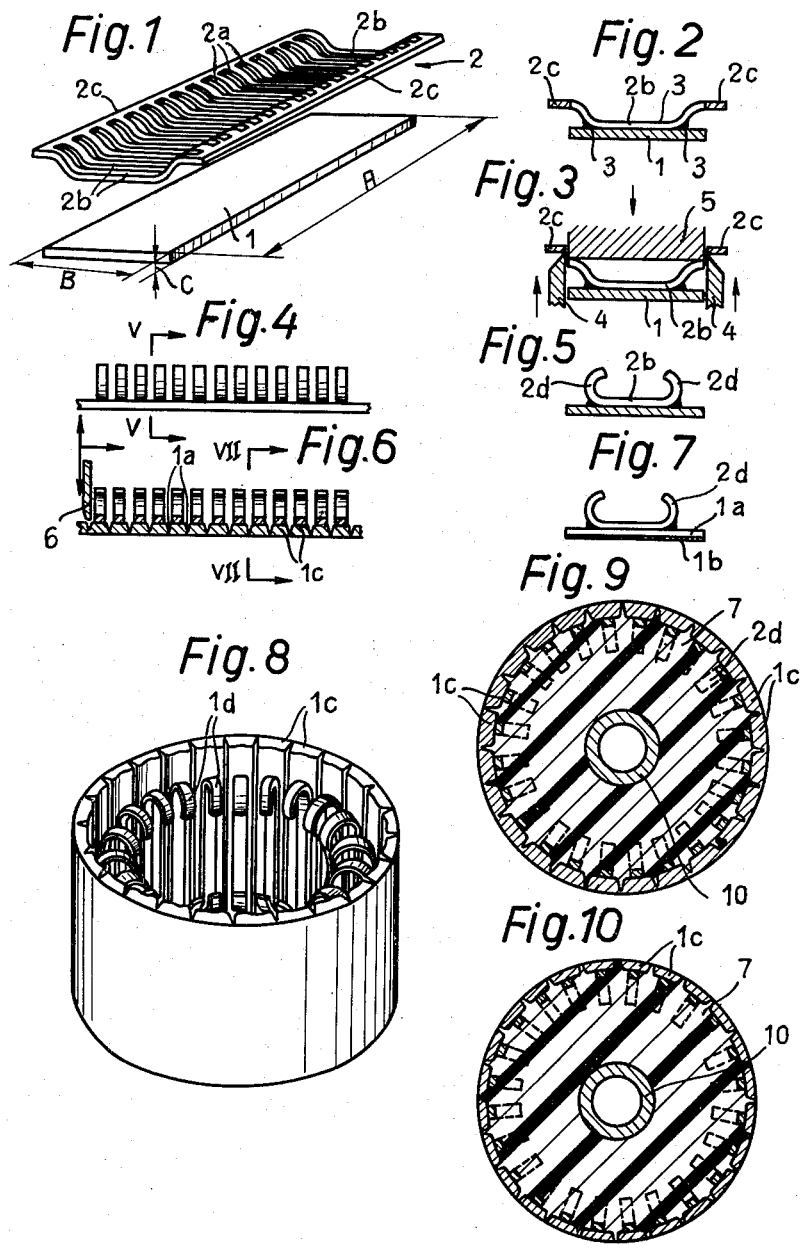

Nov. 7, 1961 P. GIANOTTO 3,007,234
METHOD OF MANUFACTURING COMMUTATORS FOR
DYNAMO-ELECTRIC MACHINES
Filed April 28, 1959 2 Sheets-Sheet 2

United States Patent Office 3,007,234
Patented Nov. 7, 1961

3,007,234
METHOD OF MANUFACTURING COMMUTATORS FOR DYNAMO-ELECTRIC MACHINES
Pietro Gianotto, Turin, Italy, assignor to Fiat Societa per Azioni, Turin, Italy
Filed Apr. 28, 1959, Ser. No. 809,504
Claims priority, application Italy May 31, 1958
3 Claims. (Cl. 29—155.54)

This invention relates to the manufacture of commutators for dynamo-electric machines and provides a method of manufacture which is inexpensive to carry out and affords a considerable economy of material over methods of this kind known to date. More particularly, according to a preferred embodiment of this invention commutators can be manufactured, in which the hooks for anchoring the individual segments to the plastic mass adapted to support and insulate the segments, can be made of ferrous metal, thereby affording a considerable reduction in cost of material and, on the other hand, an improved strength of the commutator over commutators known heretofore.

The improved method comprises the steps of providing a rectangular plate of copper substantially equalling in length the desired circumference of the commutator, in width the desired commutator length and in thickness the desired segment thickness, welding flat metal tongues on the plate in the number of at least one for each segment of the commutator to be manufactured, the tongues being spaced according to the desired segment pitch, coining the plate between the tongues to obtain transverse grooves separating the segments from one another, curving the plate to a hollow cylinder having the tongues positioned within the cylinder, moulding a mass of insulating plastic material within the hollow cylinder embedding the segment anchoring tongues, machining the outer surface of the cylinder down to the groove bottom thereby separating the segments from one another.

Further characteristic features of this invention will be understood from the appended detailed description referring to the accompanying drawings given by way of a non-limiting example, wherein:

FIGURES 1 to 9 show the various steps of manufacture of the commutator according to a preferred embodiment of this invention, FIGURE 10 is a diametrical sectional view of a commutator manufactured according to the above first embodiment and FIGURES 11 to 16 show a modification of the method.

The components employed for the manufacture of the commutator according to the embodiment shown in FIGURES 1-10 are shown in a perspective view in FIGURE 1, said components comprising a rectangular plate of copper of a length A substantially equalling the desired commutator circumference, a width B substantially equalling the desired commutator length and a thickness C approximately equalling the desired thickness of the segments; and a strip 2 of ferrous metal formed with equally spaced transverse slots 2a approximately in accordance with the desired segment pitch; the slots thus confine transverse tongues 2b which are obviously spaced by the same pitch as desired for the commutator segments and are interconnected by the longitudinal edges 2c of the strip 2.

The strip 2 is in the form of a widely flared channel, the slots 2a therein being in a projection on the plate of copper slightly greater in length than the width of the plate.

The strip 2 is welded flat by its base along the longitudinal middle line of the copper plate to form a blank which is shown in a cross-sectional view in FIGURE 2. The copper plate 1 and strip 2 can be soldered together by means of a solder 3 such as a silver alloy, or electrically point- or seam-welded together.

The longitudinal edges 2c of the strip 2 are subsequently severed by means of cutters 4 cooperating with a stationary die 5, whereby the tongues 2b result severed from one another and separately welded to the copper plate 1 transversely of the latter.

Since the slots 2a in a projection on the copper plate slightly exceed in length the width of the plate, the cutter stroke for severing the longitudinal edges of the strip 2 can be effected in a direction perpendicular to the general plane of the copper plate without interfering with the plate edges.

The ends 2d of the tongues 2b are subsequently bent backwards and towards the center of the copper plate (FIGURES 4 and 5, FIGURE 4 being a side view of the blank in its condition during this step, FIGURE 5 being a sectional view of FIGURE 4 on line V—V).

The next step of the process, which is shown in FIGURES 6 and 7, FIGURE 6 being a longitudinal sectional view of the blank resulting from this step, FIGURE 7 being a cross-sectional view of FIGURE 6 on line VII—VII, consists in forming in the copper plate transverse grooves 1a between adjacent tongues 2b. The grooves are cut by means of a cutter 6 reciprocating with respect to the copper plate 1 and performing on each reciprocation an indexing movement in the longitudinal direction of the blank, or, alternatively, by means of a number of cutters which simultaneously cut all the grooves in the blank, or else by means of a coining die.

Each groove 1a is of a depth such as to leave a web section 1b of very reduced thickness in the copper plate. This step forms commutator segments 1c mutually spaced by web sections 1b of reduced thickness. The resulting blank is thereafter (FIGURE 8) curved to a hollow cylinder into which (compare FIGURE 9 which is a diametrical sectional view of the blank at this stage of the process) a mass 7 of insulating plastic material is molded, embedding the hooks 2d for anchorage of the commutator segments. A metal bushing 10 is moreover secured on molding in the plastic mass 7. The outer surface of the blank is subsequently machined on a lathe (FIGURE 10) to remove all the web sections 1b, whereby the commutator segments are separated from one another, said segments being mutually insulated by the plastic mass 7.

Figure 12:
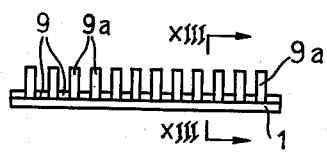
Figure 13:
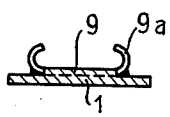
Figure 14:
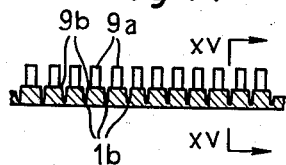
Figure 15:
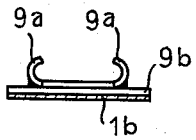
Figure 16:
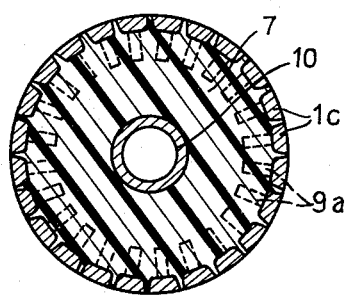

According to the embodiment shown in FIGURES 11-15 the components for manufacturing the commutator comprise a copper plate 1 of the same dimensions as the plate denoted by the same reference numeral in the first embodiment and a strip 9, conveniently made of copper, approximately equalling in length and smaller in width than the copper plate. The strip 9 is provided on both longitudinal edges with inwardly bent hooks 9a spaced on each edge approximately in accordance with the desired pitch of the commutator segments. The strip 9 is welded flat along the longitudinal middle line of the plate 1 as indicated in FIGURES 12 and 13, which are a side view of the blank at this stage of the process and a sectional view on line XIII—XIII of FIGURE 12.

Cross grooves 9b between adjacent tongues are subsequently coined in the strip 1 and plate 9 similarly as described with reference to FIGURES 6 and 7 showing the previous embodiment. The grooves cut the strip 9 through and deeply enter the plate 1 merely leaving a thin web section 1b separating the segments.

The further steps of the process are similar to those described with reference to the embodiment shown in FIGURES 1–10, namely, they include curving the copper plate and strip fast therewith to a hollow cylinder thereby positioning the hooks within the cylinder, molding within the hollow cylinder a mass 7 of plastic material embedding the segment anchoring hooks 9a and machining the outer surface of the copper cylinder down to the bottom of the grooves 9a, thereby separating the segments from one another. The commutator consequently takes the cross-sectional shape shown in FIGURE 16.

The first described embodiment of this invention affords a reduction in cost of material, since the strip 2 can be made of ferrous metal, while the embodiment shown in FIGURES 11–16, though necessitating a copper strip 9, is likewise convenient, in that the steps of manufacture of the commutator are simplified.

What I claim is:

1. Method of manufacturing a commutator for a dynamo-electric machine comprising the steps of providing a rectangular plate of copper substantially equalling in length and width the desired commutator circumference and axial length, respectively; providing an anchoring-tongue unit for the said plate comprising a generally rectangular strip of ferrous metal of a length substantially equal to that of the copper plate, having its opposite longitudinal edge zones deflected from a flat longitudinal middle zone and having a plurality of transverse slots therein extending through a part only of the width of the strip thereby defining a plurality of anchoring tongues of ferrous metal integral with each other; brazing the said flat longitudinal middle zone only of the strip to one face of the copper plate in a mutually superposed arrangement in which the said longitudinal edge zones of the strip are deflected in the same direction from the said one face of the plate; completely opening the slots in the strip thereby separating the anchoring tongues from each other; forming a transverse groove in the said one face of the copper plate between each pair of successive tongues; curving the grooved plate to a hollow cylinder having the tongues located within the cylinder; molding within the cylinder a mass of electrically insulating plastic material embedding the tongues; and machining the outer surface of the cylinder down to the bottoms of the grooves thereby to obtain a plurality of electrically separated copper segments.

2. Method of manufacturing a commutator for a dynamo-electric machine comprising the steps of providing a rectangular plate of copper substantially equalling in length and width the desired commutator circumference and axial length, respectively; providing an anchoring-tongue unit for the said plate comprising a generally rectangular strip of ferrous metal of a length substantially equal to that of the copper plate and of a width greater than the width of the plate, having its opposite longitudinal edge zones deflected from a flat longitudinal middle zone and having a plurality of transverse closed-ended slots therein extending each across the said strip through an extent greater than the width of the copper plate thereby defining a unitary series of mutually parallel anchoring tongues of ferrous metal connected together by opposite extreme longitudinal edge regions of the strip; brazing the said flat longitudinal middle zone only of the strip to one face of the copper plate in a mutually superposed arrangement in which the said longitudinal edge zones of the strip are deflected in the same direction from the said one face of the plate and in which the said opposite extreme longitudinal edge regions project beyond the respective longitudinal edges of the plate; trimming the said longitudinal extreme edge regions thereby separating the anchoring tongues from each other; forming a transverse groove in the said one face of the copper plate between each pair of successive tongues; curving the grooved plate to a hollow cylinder having the tongues located within the cylinder; molding within the cylinder a mass of electrically insulating material embedding the tongues; and machining the outer surface of the cylinder down to the bottoms of the grooves thereby to obtain a plurality of electrically separated copper segments.

3. Method of manufacturing a commutator for a dynamo-electric machine comprising the steps of providing a rectangular plate of copper substantially equalling in length and width the desired commutator circumference and axial length, respectively, the said plate having on one face thereof a plurality of parallel transverse grooves uniformly spaced therebetween thereby defining in the plate a plurality of segments for the commutator; providing an anchoring-tongue unit for the said plate comprising a generally rectangular strip of ferrous metal of a length substantially equal to that of the copper plate having its opposite longitudinal edge zones deflected from a flat longitudinal middle zone and having a plurality of transverse closed-ended slots therein defining a plurality of mutually parallel anchoring tongues of ferrous metal connected together by opposite extreme longitudinal edge regions of the strip at a mutual spacing equal to that of the segments defined in the plate; superposing the said longitudinal middle zone of the strip on the grooved face of the plate in an arrangement in which the said longitudinal edge zones are deflected in the same direction from the grooved face and in which successive anchoring tongues are superposed on respectively successive segments; brazing the said longitudinal middle zone only of the strip to the plate while in the said arrangement; trimming the said longitudinal extreme edge regions of the strip thereby separating the anchoring tongues from each other; curving the tongue-equipped plate to a hollow cylinder having the tongues located within the cylinder; molding within the cylinder a mass of electrically insulating material embedding the tongues; and machining the outer surface of the cylinder down to the bottom of the grooves thereby to obtain a plurality of electrically separated copper segments.

References Cited in the file of this patent

UNITED STATES PATENTS

| | | |
|---|---|---|
| 2,438,046 | Giannuzzi et al. | Mar. 16, 1948 |
| 2,634,495 | Callsen et al. | Apr. 14, 1953 |
| 2,671,866 | Camprubi | Mar. 9, 1954 |